(12) United States Patent
Ezzi

(10) Patent No.: US 10,027,151 B2
(45) Date of Patent: Jul. 17, 2018

(54) SMART PHONE CHARGING SYSTEM

(71) Applicant: Husain Yusuf Ezzi, San Antonio, TX (US)

(72) Inventor: Husain Yusuf Ezzi, San Antonio, TX (US)

( * ) Notice: Subject to any disclaimer, the term of this patent is extended or adjusted under 35 U.S.C. 154(b) by 53 days.

(21) Appl. No.: 15/196,437

(22) Filed: Jun. 29, 2016

(65) Prior Publication Data

US 2018/0006477 A1    Jan. 4, 2018

(51) Int. Cl.
| | | |
|---|---|---|
| *H02J 7/00* | (2006.01) | |
| *H04B 1/3888* | (2015.01) | |
| *H04B 1/3883* | (2015.01) | |
| *H04M 1/04* | (2006.01) | |
| *H04M 1/02* | (2006.01) | |
| *H04M 1/18* | (2006.01) | |

(52) U.S. Cl.
CPC .......... *H02J 7/0044* (2013.01); *H02J 7/0052* (2013.01); *H04B 1/3883* (2013.01); *H04B 1/3888* (2013.01); *H04M 1/04* (2013.01); *H04M 1/0274* (2013.01); *H04M 1/185* (2013.01)

(58) Field of Classification Search
CPC ....... Y02E 60/12; H02J 7/0044; H02J 7/0042; H02J 7/0045; H01M 2/1022
USPC ........................................................ 320/114
See application file for complete search history.

(56) References Cited

U.S. PATENT DOCUMENTS

| | | | |
|---|---|---|---|
| 7,479,759 B2 | 1/2009 | Vilanov | |
| 7,619,388 B1 | 11/2009 | Nana | |
| 7,782,610 B2 | 8/2010 | Diebel | |
| D664,091 S | 7/2012 | Pliner et al. | |
| 9,049,782 B2 | 6/2015 | Koenig | |
| 2009/0160400 A1* | 6/2009 | Woud | H02J 7/0042 320/115 |
| 2011/0159324 A1* | 6/2011 | Huang | H01M 2/1022 429/7 |
| 2012/0169276 A1* | 7/2012 | Wang | H02J 7/0042 320/108 |
| 2012/0187902 A1* | 7/2012 | Wang | H02J 7/00 320/107 |
| 2013/0278207 A1* | 10/2013 | Yoo | H02J 7/025 320/108 |
| 2013/0278215 A1 | 10/2013 | Dea et al. | |
| 2014/0035511 A1* | 2/2014 | Ferber | H02J 7/0042 320/103 |
| 2014/0191707 A1* | 7/2014 | Carreon | H04M 1/04 320/107 |
| 2014/0253038 A1 | 9/2014 | Posa | |
| 2015/0035472 A1* | 2/2015 | Yang | H02J 7/0042 320/103 |
| 2015/0263775 A1 | 9/2015 | Vila | |

FOREIGN PATENT DOCUMENTS

WO    WO2015084775    6/2015

* cited by examiner

*Primary Examiner* — Arun Williams

(57) ABSTRACT

A smart phone charging system for storing and charging a smart phone includes a case that may contain an electronic device. A charging unit is coupled to the case. The charging unit has a port that may be electrically coupled to the electronic device when the electronic device is positioned in the case. The charging unit has a plug that is selectively extended outwardly from the case. Thus, the plug may be electrically coupled to a power source. The charging unit is biased to retract the plug within the case.

1 Claim, 5 Drawing Sheets

SMART PHONE CHARGING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98

The disclosure and prior art relates to charging devices and more particularly pertains to a new charging device for storing and charging a smart phone.

BRIEF SUMMARY OF THE INVENTION

An embodiment of the disclosure meets the needs presented above by generally comprising a case that may contain an electronic device. A charging unit is coupled to the case. The charging unit has a port that may be electrically coupled to the electronic device when the electronic device is positioned in the case. The charging unit has a plug that is selectively extended outwardly from the case. Thus, the plug may be electrically coupled to a power source. The charging unit is biased to retract the plug within the case.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
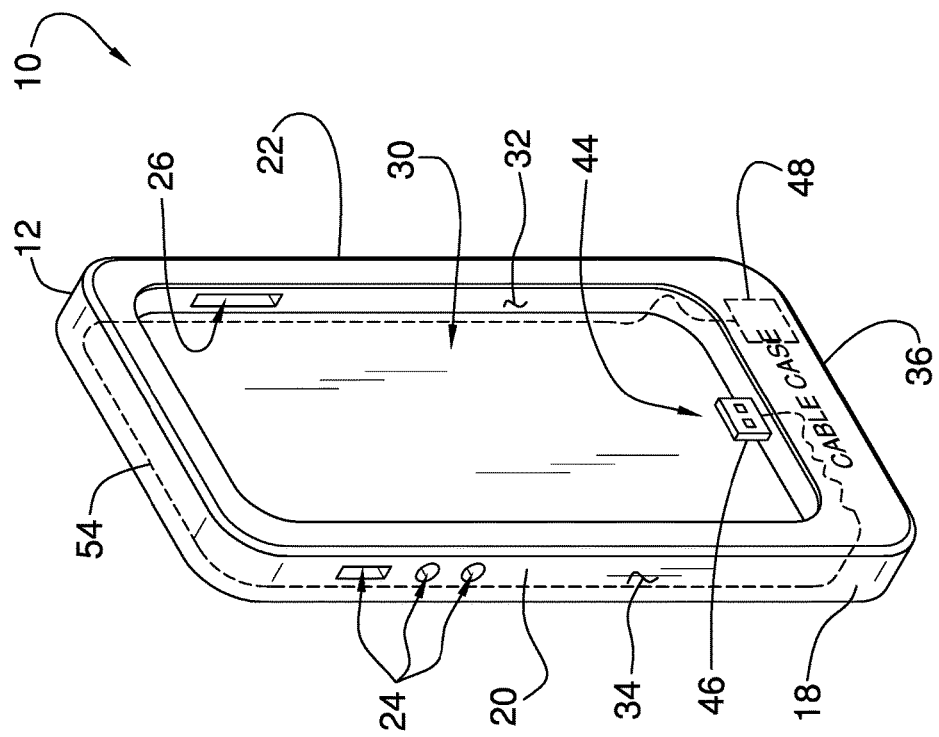
FIG. 1 is a front perspective view of a smart phone charging system according to an embodiment of the disclosure.
Figure 2:
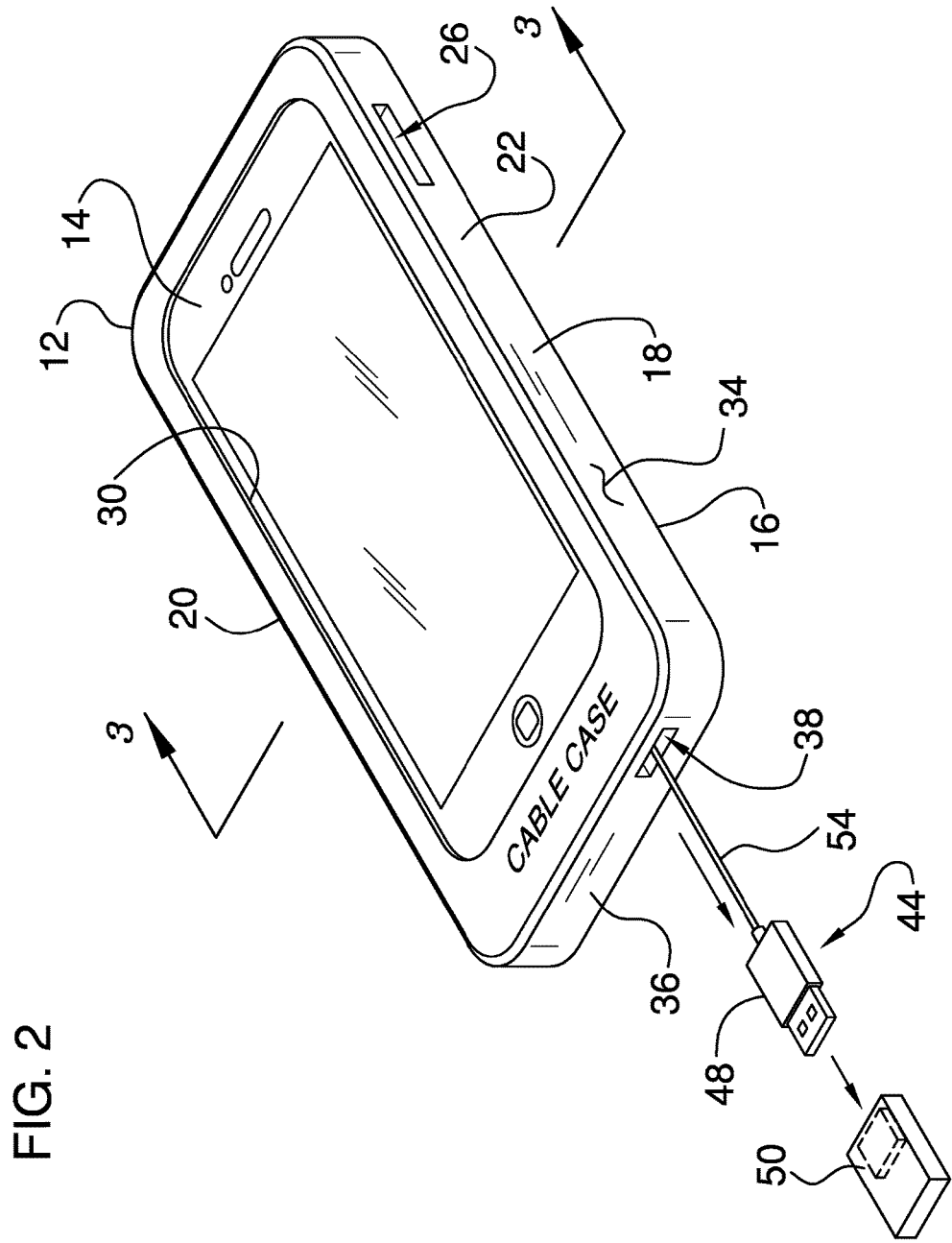
FIG. 2 is a perspective view of an embodiment of the disclosure.
Figure 3:
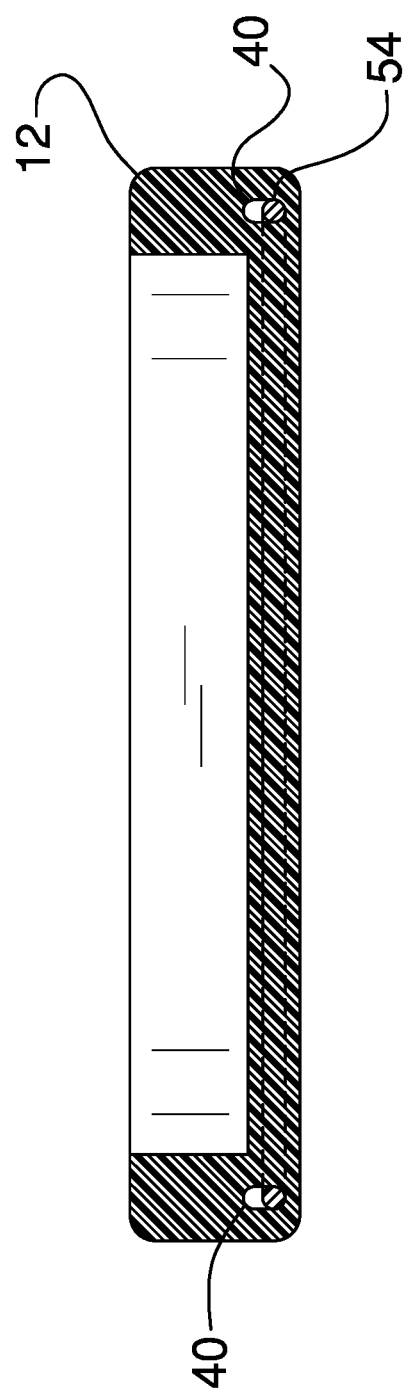
FIG. 3 is a cross sectional view taken along line 3-3 of FIG. 2 of an embodiment of the disclosure.
Figure 4:
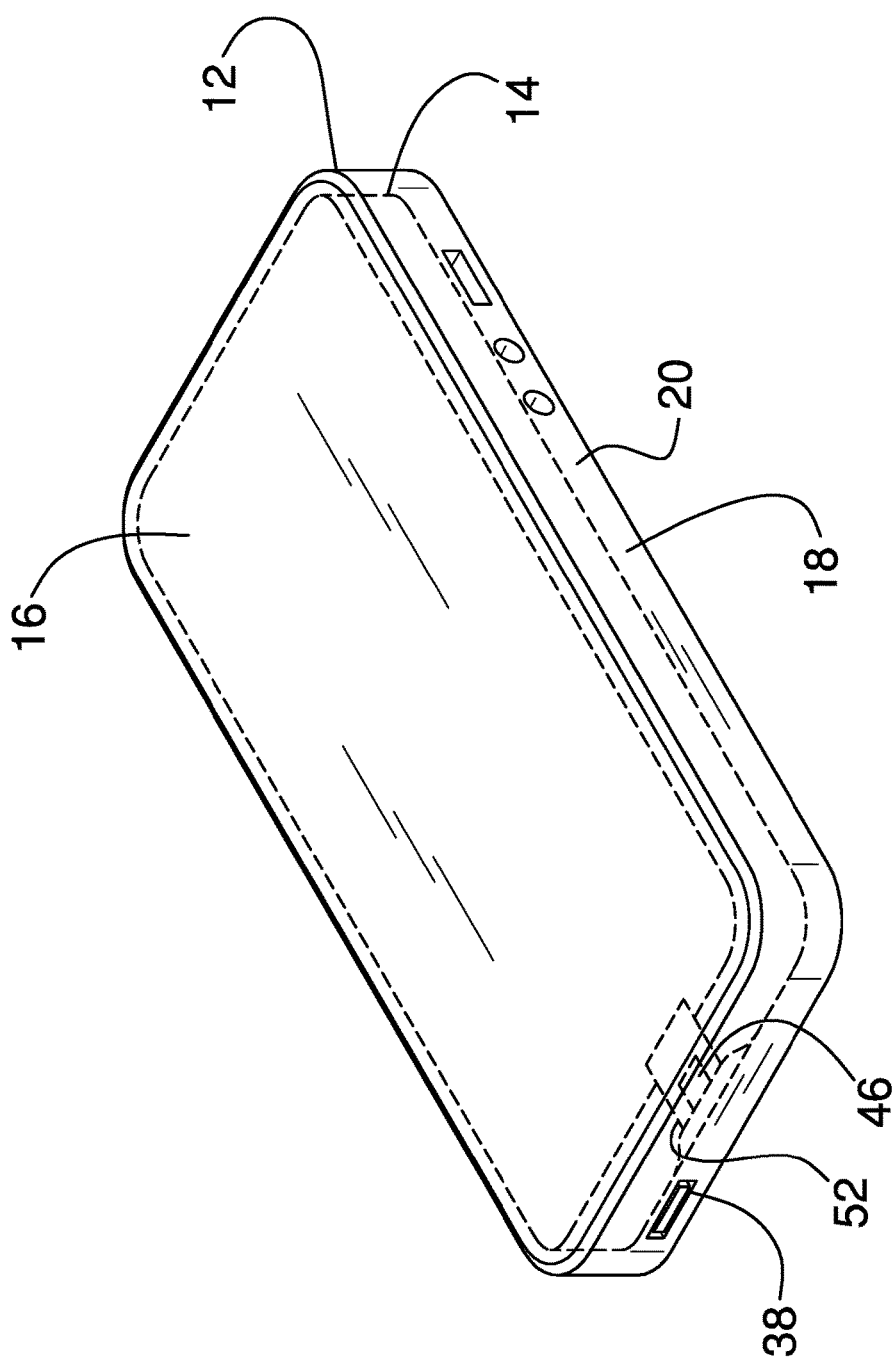
FIG. 4 is a back perspective view of an embodiment of the disclosure.
Figure 5:
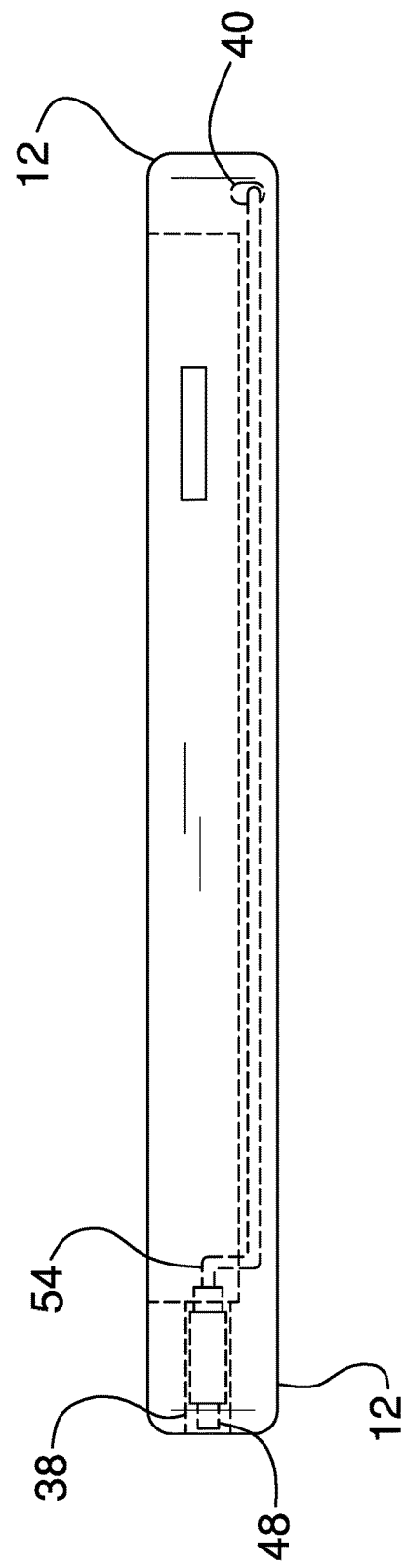
FIG. 5 is a right side phantom view of an embodiment of the disclosure.

With reference now to the drawings, and in particular to FIGS. 1 through 5 thereof, a new charging device embodying the principles and concepts of an embodiment of the disclosure and generally designated by the reference numeral 10 will be described.

As best illustrated in FIGS. 1 through 5, the smart phone charging system 10 generally comprises a case 12 that may contain an electronic device 14. The case 12 has a bottom wall 16 and a peripheral wall 18 extending upwardly therefrom. The peripheral wall 18 is coextensive with a perimeter of the bottom wall 16. The electronic device 14 may comprise a smart phone or other hand held electronic device 14. The case 12 may comprise a smart phone case 12 or the like.

The peripheral wall 18 may have a first lateral side 20 and a second lateral side 22. A plurality of apertures 24 may extend through the first lateral side 20. A hole 26 may extend through the second lateral side 22. Each of the apertures 24 and the hole 26 may facilitate manipulation of the electronic device 14.

The peripheral wall 18 has an inwardly facing surface 32, an outwardly facing 34 surface and a first side 36. The outwardly facing surface 34 corresponding to the first side 36 has a charger well 38 extending inwardly therein. The inwardly facing surface 32 defines an opening 30 extending into the case 12. The opening 30 facilitates the electronic device 12 to be manipulated. A conduit 40 is positioned within the peripheral wall 18. The conduit 40 is substantially coextensive with the peripheral wall 18. Moreover, the conduit 40 intersects the charger well 38.

A charging unit 44 is coupled to the case 12 and the charging unit 44 includes a port 46. The port 46 is electrically coupled to the electronic device 14 when the electronic device 14 is positioned in the case 12. The charging unit 44 has a plug 48 that is selectively extended outwardly from the case 12. Thus, the plug 48 may be electrically coupled to a power source 50. The charging unit 44 is biased to retract the plug 48 within the case 12. The plug 48 may comprise a USB port or the like. Thus, the plug 48 may be electrically coupled to a smart phone charger, a personal computer or other device commonly used to charge smart phones.

The port 46 is positioned on the inwardly facing surface 32 corresponding to the first side 36. Thus, the port 46 electrically engages a charge port 52 on the electronic device 14 when the electronic device 14 is positioned in the case 12. The port 46 may comprise an eight pin connector for an iPhone 6S or the like. The port 46 may additionally comprise a micro-usb charge port for an Android phone or the like. The port 46 is manufactured to correspond to the needs of the electronic device 14.

A conductor 54 is movably positioned within the conduit 40 and the conductor 54 is electrically coupled to the port 46. The conductor 54 extends into the charger well 38. The conductor 54 may comprise a USB cord or the like. The conductor 54 has a length that is longer than a length of the conduit 40. Thus, the conductor 54 may be coiled in the conduit 40. The conductor 54 may be retractably biased into the conduit 40 through any conventional means.

The plug 48 is positioned within the charger well 38 and the plug 48 may be manipulated. The plug 48 may be urged outwardly from the charger well 38. The plug 48 is electrically coupled to the conductor 54. The plug 48 may be selectively electrically coupled to the power source 50 thereby facilitating the electronic device 14 to be charged. The power source 50 may comprise a USB port or the like. The plug 48 may comprise a USB plug or the like.

In use, the electronic device 14 is positioned in the case 12 and the port is electrically coupled to the charge port 52 on the electronic device 14. The plug 48 is selectively manipulated to extend the conductor 54 outwardly from the charger well 38. Thus, the plug 48 may be electrically coupled to the power source 50. Moreover, the conductor 54 is retracted into the conduit 40 when the plug 48 is removed from the power source 50. The charging unit 44 facilitates constant availability of a smart phone charger.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart phone charging system comprising:

a case being configured to contain an electronic device, said case having a bottom wall and a peripheral wall extending upwardly therefrom, said peripheral wall being coextensive with a perimeter of said bottom wall, said peripheral wall having an inwardly facing surface, an outwardly facing surface and a first side, said inwardly facing surface defining an opening into said case wherein said opening is configured to facilitate the electronic device to be manipulated, said outwardly facing surface corresponding to said first side having a charger well extending inwardly therein, said case having a conduit being positioned within said peripheral wall, said conduit being substantially coextensive with said peripheral wall, said conduit intersecting said charger well; and a charging unit being coupled to said case, said charging unit having a port being configured to be electrically coupled to the electronic device when the electronic device is positioned in said case, said charging unit having a plug being selectively extended outwardly from said case wherein said plug is configured to be electrically coupled to a power source, said charging unit being biased to retract said plug within said case, said charging unit comprising:

said port being positioned on said inwardly facing surface corresponding to said first side wherein said port is configured to electrically engage a charge port on the electronic device, a conductor being movably positioned within said conduit, said conductor being electrically coupled to said port, said conductor extending into said charging well, and said plug being positioned within said charging well wherein said plug is configured to be manipulated thereby facilitating said plug to be urged outwardly from said charging well, said plug being electrically coupled to said conductor, said plug being configured to be selectively electrically coupled to a power source thereby facilitating the electronic device to be charged.

* * * * *